United States Patent
Bliley et al.

(10) Patent No.: US 8,054,021 B2
(45) Date of Patent: Nov. 8, 2011

(54) PROGRAMMABLE MOTOR DRIVE

(75) Inventors: Paul D. Bliley, Vancouver, WA (US);
Steve P. Stemple, Vancouver, WA (US);
David Branson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 12/255,028

(22) Filed: Oct. 21, 2008

(65) Prior Publication Data

US 2009/0108789 A1   Apr. 30, 2009

Related U.S. Application Data

(60) Provisional application No. 60/984,214, filed on Oct. 31, 2007.

(51) Int. Cl.
*H02P 6/00* (2006.01)
(52) U.S. Cl. ......... 318/400.29; 318/400.21; 318/400.22; 318/563

(58) Field of Classification Search ............... 318/563, 318/400.21, 400.22, 400.29, 599
See application file for complete search history.

(56) References Cited

U.S. PATENT DOCUMENTS

| | | | | |
|---|---|---|---|---|
| 5,032,780 A * | 7/1991 | Hopkins | ........................ | 318/696 |
| 5,032,781 A * | 7/1991 | Kronenberg | .................. | 318/696 |
| 5,070,292 A | 12/1991 | Goff | | |
| 5,350,988 A | 9/1994 | Le | | |
| 5,963,706 A | 10/1999 | Baik | | |
| 6,683,437 B2 * | 1/2004 | Tierling | ........................ | 318/811 |
| 7,098,619 B2 * | 8/2006 | Stridsberg | ...................... | 318/563 |
| 7,180,257 B1 | 2/2007 | Schneider et al. | | |
| 7,199,535 B2 * | 4/2007 | Welchko et al. | ............... | 318/105 |
| 2005/0088125 A1 | 4/2005 | Bliley et al. | | |

* cited by examiner

*Primary Examiner* — Walter Benson
*Assistant Examiner* — Thai Dinh

(57) ABSTRACT

A system comprises host logic and a programmable motor drive coupled to the host logic and configured to drive a motor. The programmable motor drive comprises a plurality of H-bridge circuits and the programmable motor drive is programmable to cause any two or more H-bridge circuits to be operated in parallel.

15 Claims, 2 Drawing Sheets

PROGRAMMABLE MOTOR DRIVE

CROSS REFERENCE TO RELATED APPLICATIONS

This Application claims the benefit of provisional patent application Ser. No 60/984,214, filed Oct. 31, 2007; entitled "Programmable Motor Drive" which application is incorporated by reference herein as if reproduced in full below.

BACKGROUND

Many types of products include motors. An example of such a product is a printer which may have more than one motor. Different types of printers have different numbers of motors. The amount of current required to operate such motors may vary from motor to motor. A motor drive circuit is provided to drive all such motors. Because of the disparity in the electrical requirements of motors from one product (e.g., printer) to another, a variety of motor drive circuits are required. Each motor drive circuit has to be designed and tested. Increasing the number of motor drive circuits unfortunately increases product development time and cost.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
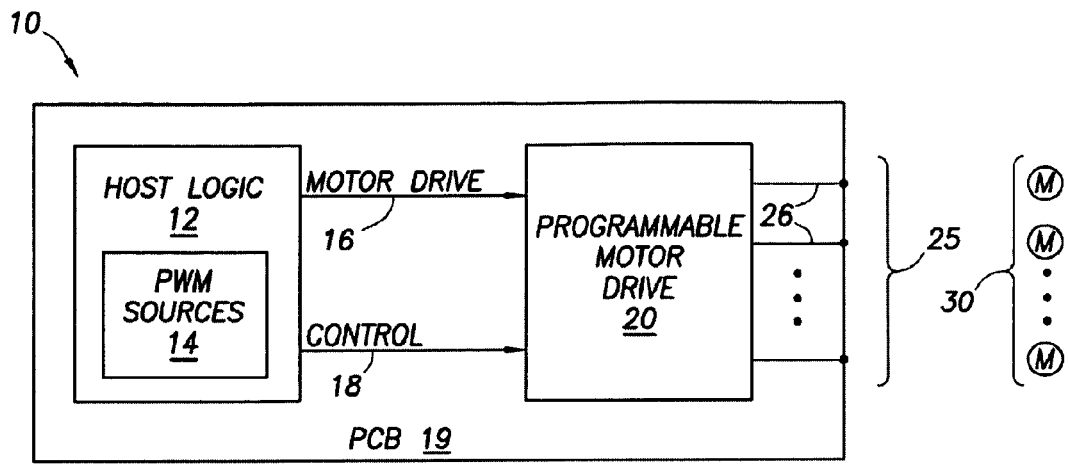
FIG. 1 shows a system in accordance with various embodiments and incorporating a programmable motor drive.

FIG. 1 shows a system 10 in accordance with various embodiments. The system 10 may be implemented as a printer or any of a variety of other devices that use motors in their operation. As shown, system 10 comprises host logic 12 coupled to a programmable motor drive 20. Motor drive 20 provides multiple output terminals 25 for connection to one or more motors. Any one or more of multiple motors 30 can be connected to the programmable motor drive 20. In accordance with at least some embodiments, the motor drive 20 provides operating current for motors 30 and can control the speed of rotation of a motor as well as the direction (e.g., forward, reverse). The programmability of the motor drive 20 enables any terminal 25 to be used to drive any desired motor 30, or multiple output terminals can be operated in parallel to drive a single motor. In general, a pair of output positive and negative terminals is used to drive a motor. Being able to couple multiple output terminals 25 in parallel to drive a single motor enables higher power motors to be driven by the programmable motor drive 20.

In accordance with various embodiments, the programmable motor drive 20 comprises a plurality of H-bridge circuits. Each such H-bridge circuit is a motor drive circuit usable to drive a given motor to control, for example, its speed and/or direction. An H-bridge circuit operates from a motor drive signal which, in some embodiments is a pulse width modulated (PWM) signal. Referring still to FIG. 1, host logic 12 comprises a plurality of PWM sources 14 that generate and provide a plurality of motor drive signals 16 (PWM signals) to the programmable motor drive 20. In addition to the motor drive signals 16, the host logic 12 provides a plurality of control signals 18 to the programmable motor drive 20. Control signals 18 cause the H-bridge circuits in the motor drive 20 to be used, possibly in parallel operation, to drive certain target motors 30. For example, the control signals 18 can cause any two or more H-bridge circuits in the motor drive 20 to be operated in parallel to drive a single motor 30.

In accordance with at least some embodiments, the host logic 12 and programmable motor drive 20 are mounted on a circuit board (e.g., printed circuit board (PCB)) 19. The programmability of the motor drive 20 to use any output terminal 25 to drive any desired motor in the system 10 enables a system designer to choose which H-bridge circuits in the programmable motor drive 20 are best utilized to drive a particular motor 30 given the preferences of the PCB designer in laying out the traces 26 on the PCB 19 from the motor drive 20. That is, the flexibility afforded by the programmable motor drive 20 described herein increases the flexibility in laying out the PCB 19. As a result, one programmable motor drive 20 can be used in a wide variety of applications and, for each such application, the selection of which H-bridge circuits are used to drive which motors is programmable.

Figure 2:
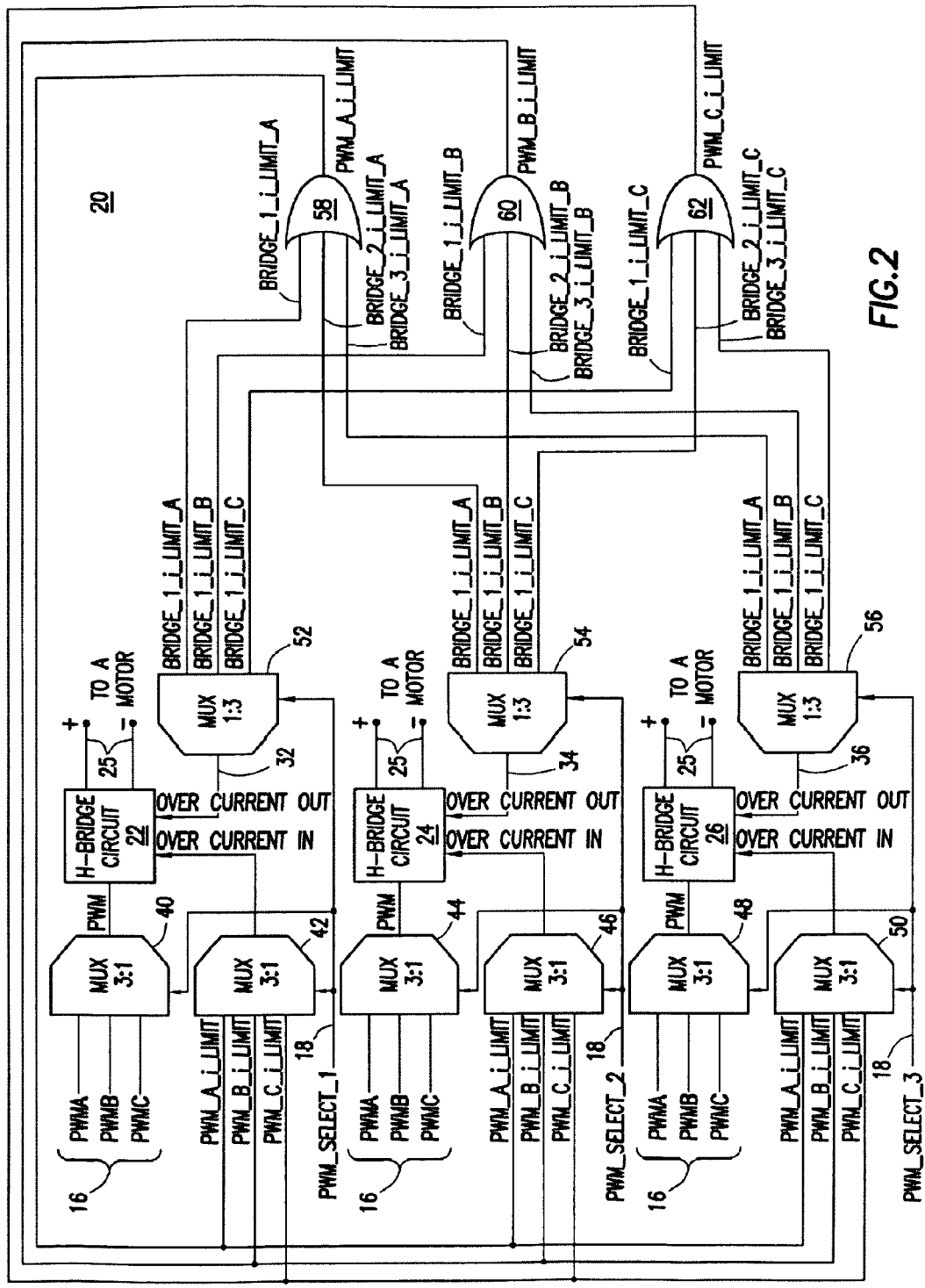
FIG. 2 shows a block diagram of the programmable motor drive of FIG. 1 in accordance with various embodiments.

FIG. 2 illustrates an embodiment of the programmable motor drive 20. As shown, the programmable motor drive 20 comprises three H-bridge circuits 22, 24, and 26, although the number of H-bridge circuits can be other than three. The rest of the logic depicted in FIG. 2 comprises selection logic that provides the programmability to the programmable motor drive 20. The selection logic thus comprises a plurality of multiplexers 40-50, a plurality of demultiplexers 52-56, and a plurality of OR gates 58-62.

In the embodiment of FIG. 2, the motor drive signals 16 from the host logic 12 comprise three PWM signals labeled as PWMA, PWMB, and PWMC. These three PWM signals are provided as inputs to each of the multiplexers 40, 44, and 48. The output of each such multiplexer 40, 44, and 48 is provided to an associated H-bridge circuit 22-26. The output of multiplexer 40 is provided as an input PWM signal to H-bridge circuit 22. The output of multiplexer 44 is provided as an input PWM signal to H-bridge circuit 24. The output of multiplexer 48 is provided as an input PWM signal to H-bridge circuit 26. Thus, each H-bridge circuit 22-26 is adapted to receive a PWM operating signal that is selected from among multiple possible input PWM signals from the host logic 12. The PWM signal to an H-bridge circuit 22-26 controls the speed and/or direction of a corresponding motor.

The control signals 18 from FIG. 1 are shown in the example of FIG. 2 as comprising three control signals labeled as PWM_select_1, PWM_select_2, and PWM_select_3 provided to each multiplexers 40, 44, and 48. Each such PWM_select signal causes its respective multiplexer to provide a select one of its input PWM signals as the multiplexer's PWM output signal. Because all three multiplexers 40, 44, and 48 receive all three PWM signals (PWMA, PWMB, and PWMC), two of the PWM_select signals (e.g., PWM_select_2 and PWM_select_3) can cause the same input PWM signal (e.g., PWMB) to be provided as the output PWM signal from two separate multiplexers (e.g., multiplexer 44 and 48). For example, PWM_select_1 may cause the PWMA input signal to multiplexer 40 to be provided as that multiplexer's output PWM signal, while PWM_select_2 may cause the PWMB input signal to multiplexer 44 to be provided as that multiplexer's output PWM signal. Further, PWM_select_3 may be configured by host logic 12 to be at the same state as PWM_select_2 and thus PWM_select_3, which controls multiplexer 48, causes multiplexer 48, like multiplexer 44, to provide its PWMB input signal as its output PWM signal. In this example, multiplexer 40 provides PWMA as its output signal, while multiplexers 44 and 48 both provide PWMB as their output signal. Because H-bridge circuits 24 and 26 operate using the same PWM signal (PWMB in this example), H-bridge circuits 24 and 26 are synchronized and thus operate in parallel. The control signals 18 enable any two or more H-bridge circuits to be operated in parallel. Each H-bridge circuit 22-26 provides a pair of output terminals 25 (+ and −) that are adapted to be connected to a motor 30.

Each H-bridge circuit 22-26 also provides an output, over-current fault signal. H-bridge circuit 22 provides an over-current fault signal 32, while H-bridge circuits 24 and 26 provide over-current fault signals 34 and 36, respectively. Upon an H-bridge circuit detecting an over-current condition, the H-bridge circuit asserts (logic high) its output over-current fault signal. The H-bridge circuit detecting the fault also blows an internal fuse (or equivalent operation) thereby ceasing the flow of current to the motor 30 connected to that H-bridge circuit. The output over-current fault signal 32, 34, 36 from the fault-detecting H-bridge circuit is provided to an input of demultiplexer. The output over-current fault signal 32 from H-bridge circuit 22 is provided to demultiplexer 52. The output over-current fault signals 34 and 36 from H-bridge circuits 24 and 26 are provided to demultiplexers 54 and 56, as shown in FIG. 2. The input signals of the demultiplexers 54-56 are provided on one of the three possible output terminals of the demultiplexers in accordance with a control signal. The control signals that control the operation of the demultiplexers are the same control signals that control the multiplexers associated with the same H-bridge circuit. Thus, the PWM_select_1 control signal is used to control multiplexers 40 and 42 as well as demultiplexer 52 associated with H-bridge circuit 22. The PWM_select_2 control signal is used to control multiplexers 44 and 46 as well as demultiplexer 54 associated with H-bridge circuit 24. The PWM_select_3 control signal is used to control multiplexers 48 and 50 as well as demultiplexer 56 associated with H-bridge circuit 26.

The three possible output signals of demultiplexer 52 are labeled as bridge_1_i_limit_A, bridge_1_i_limit_B, and bridge_1_i_limit_C. The three possible output signals of demultiplexer 54 are labeled as bridge_2_i_limit_A, bridge_2_i_limit_B, and bridge_2_i_limit_C. The three possible output signals of demultiplexer 56 are labeled as bridge_3_i_limit_A, bridge_3_i_limit_B, and bridge_3_i_limit_C.

Referring still to FIG. 2, the three outputs of demultiplexers 52, 54, and 56 are provided as input signals to OR gates 58, 60, and 62. As shown, the bridge_1_i_limit_A, bridge_2_i_limit_A, and bridge_3_i_limit_A over-current fault signals (the "A" over-current limit signals) from each of the three demultiplexers are OR'd together by OR gate 58. The output of OR gate 58 (the signal labeled PWM_A_i_limit) is asserted high if any of the A over-current limit signals from any of the three demultiplexers is asserted high. Similarly, OR gate 60 OR's together the bridge_1_i_limit_B, bridge_2_i_limit_B, and bridge_3_i_limit_B over current fault signals (the "B" over-current limit signals). Accordingly, the output of OR gate 60 (the signal labeled PWM_B_i_limit) is asserted high if any of the B over-current limit signals from any of the three demultiplexers is asserted high. Finally, OR gate 62 OR's together the bridge_1_i_limit_C, bridge_2_i_limit_C, and bridge_3_i_limit_C over current fault signals (the "C" over-current limit signals). Accordingly, the output of OR gate 62 (the signal labeled PWM_C_i_limit) is asserted high if any of the C over-current limit signals from any of the three demultiplexers is asserted high.

The OR gate outputs (PWM_A_i_limit, PWM_B_i_limit, PWM_C_i_limit) are all provided as inputs to each of the multiplexers 42, 46, and 50. As noted above, each such multiplexer 42, 46, and 50 is controlled by the same control signal 18 as controls the other multiplexer and demultiplexer associated with the same H-bridge circuit 22-26. As a result, if a pair of H-bridge circuits are operated in parallel as described above and one of such H-bridge circuits detects an over-current fault condition, that H-bridge circuit will cease operating and its output fault signal will propagate through the corresponding demultiplexers 52-56, OR gates 58-62 and multiplexers 42, 46, and 50 as an input over-current signal to the other H-bridge circuit in the pair. The H-bridge circuit, receiving as an input, the over-current fault signal originating from its parallel partner H-bridge circuit, is caused to cease operating (e.g., blows an internal fuse). Thus, the demultiplexers 52-56, OR gates 58-62 and multiplexers 42, 46, and 50 function to broadcast an over-current fault signal to all H-bridges that are being operated in parallel.

Figure 3:
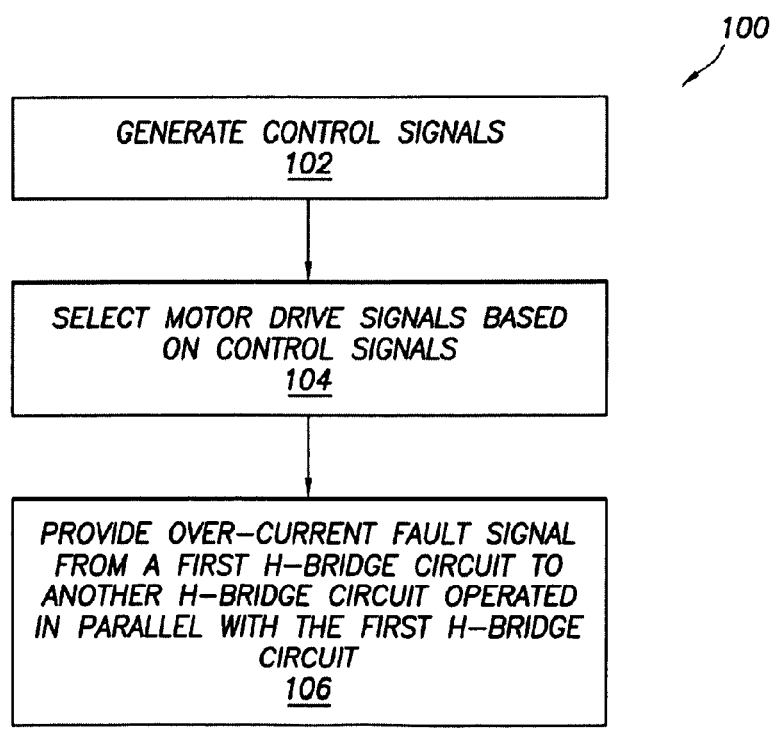
FIG. 3 shows a method in accordance with various embodiments.

FIG. 3 illustrates a method 100 in accordance with various embodiments. At 102, the method comprises generating control signals 18. At 104, the method comprises selecting various motor drive signals (e.g., PWMA, PWMB, PWMC) to be provided to the H-bridge circuits based on the control signals so that at least two H-bridge circuits are operated in parallel. At 106, the method further comprises providing an over-current fault signal from a first H-bridge circuit to another H-bridge circuit operated in parallel with the first H-bridge circuit.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:

host logic; and a programmable motor drive coupled to said host logic and configured to drive a motor, wherein said programmable motor drive comprises a plurality of H-bridge circuits and said programmable motor drive is programmable to cause any two or more H-bridge circuits to be operated in parallel;

wherein said programmable motor drive further comprises programmable selection logic that enables any of multiple H-bridge drive signals to be provided to any of said H-bridge circuits; and wherein each H-bridge circuit has an output over-current signal, and wherein said programmable selection logic enables an over-current output signal from a first H-bridge to be provided as an input over-current signal to another H-bridge circuit that is coupled together and operated in parallel with the first H-bridge circuit.

2. The system of claim 1 wherein said H-bridge drive signals comprise pulse width modulated (PWM) signals.

3. The system of claim 1 wherein said selection logic comprises a multiplexer associated with each H-bridge circuit.

4. The system of claim 3 wherein each multiplexer receives a control signal from said host logic that causes the multiplexer to provide one of multiple possible over current limit input signals to the H-bridge circuit associated such multiplexer.

5. The system of claim 3 wherein each multiplexer receives a control signal from said host logic that causes the multiplexer to provide one of multiple input motor drive signals to be provided to the H-bridge circuit associated such multiplexer.

6. The system of claim 1 further comprising a demultiplexer associated with each H-bridge circuit, each demultiplexer receives an over-current signal from the associated H-bridge circuit.

7. The system of claim 6 further comprising an OR-gate that receives signals from at least some of said demultiplexers, wherein the output of said OR-gate is provided as an input to multiplexers coupled to the H-bridge circuits to thereby provide an indication of an over-current condition to all H-bridges that are coupled and operated in parallel.

8. An apparatus, comprising:

a plurality of H-bridge circuits, each adapted to drive a motor; and selection logic coupled to said H-bridge circuits and configurable to cause any two or more of said H-bridge circuits to be operated in parallel;

wherein said selection logic causes an over-current fault signal from a first H-bridge circuit to be provided as an input over-current fault signal to any other H-bridge circuit coupled to the first H-bridge circuit.

9. The apparatus of claim 8 wherein said selection logic comprises a plurality of multiplexers, one multiplexer being coupled to an associated H-bridge circuit and each such multiplexer configurable to provide any of multiple motor drive signals to the associated H-bridge circuit.

10. The apparatus of claim 9 wherein the motor drive signals comprise pulse width modulated (PWM) signals.

11. The apparatus of claim 8 wherein said selection logic comprises a plurality of demultiplexers, one demultiplexer being coupled to and receiving an over-current fault signal from an associated H-bridge circuit, and wherein each demultiplexer is controlled by a control signal that also species to the selection logic which of multiple motor drive signals to provide to the associated H-bridge circuit.

12. The apparatus of claim 11 wherein said selection logic further comprises a plurality of OR gates, one OR gate coupled to each demultiplexer, and wherein each OR gate receives an output signal from each of said demultiplexers.

13. The apparatus of claim 8 wherein said selection logic comprises a plurality of multiplexers and provides a separate control signal to each multiplexer, each multiplexer receiving a plurality of motor drive signals, and each control signal causing an associated multiplexer receiving such control signal to provide a select motor drive signal to be provided to an associated H-bridge circuit.

14. A method, comprising generating a plurality of control signals;

selecting motor drive signals to be provided to H-bridge circuits based on said control signals so that at least two H-bridge circuits are operated in parallel; and providing an over-current fault signal from a first H-bridge circuit to another H-bridge circuit operated in parallel with the first H-bridge circuit.

15. The method of claim 14 wherein providing the over-current fault signal comprising using at least one of said control signals.

* * * * *